United States Patent
Koch

(12) 
(10) Patent No.: US 6,290,486 B1
(45) Date of Patent: Sep. 18, 2001

(54) APPARATUS FOR EXPANDING MOLD CAVITIES FOR MAKING PLASTIC ARTICLES WITH VOLUME EXPANDING AGENTS

(75) Inventor: Michael Koch, Chancy (CH)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/572,685

(22) Filed: May 16, 2000

Related U.S. Application Data

(62) Division of application No. 09/203,457, filed on Dec. 2, 1998, now Pat. No. 6,099,769.
(60) Provisional application No. 60/069,640, filed on Dec. 15, 1997.

(51) Int. Cl.[7] .............................. B28B 7/02; B29C 45/04
(52) U.S. Cl. ..................... 425/556; 249/158; 425/572; 425/576
(58) Field of Search .................................. 425/576, 543, 425/556, 540, 572, 580; 264/328.7; 249/155, 158

(56) References Cited

U.S. PATENT DOCUMENTS

| | | | |
|---|---|---|---|
| 3,881,855 | * 5/1975 | Farkas | 425/342 |
| 4,077,759 | * 3/1978 | Saumsiegle et al. | 425/451 |
| 4,387,066 | * 6/1983 | Pip | 264/55 |
| 4,413,744 | * 11/1983 | Babiol | 215/355 |
| 4,584,158 | * 4/1986 | Nilsson et al. | 264/529 |
| 4,815,960 | * 3/1989 | Rudolph | 425/522 |
| 5,160,752 | * 11/1992 | Urayama et al. | 425/577 |
| 5,304,579 | * 4/1994 | Hara et al. | 521/51 |
| 5,547,621 | * 8/1996 | Naritomi | 264/51 |
| 5,599,567 | * 2/1997 | Gellert | 425/526 |
| 6,089,854 | * 7/2000 | Outreman et al. | 425/526 |

* cited by examiner

Primary Examiner—Nam Nguyen
Assistant Examiner—Emmanuel S. Luk
(74) Attorney, Agent, or Firm—Bachman & LaPointe, P.C.

(57) ABSTRACT

Molded plastic articles are prepared in accordance with the process and apparatus of the present invention. A first mold cavity is filled via a feeding unit in engagement with a first mold cavity with plastic containing a volume expanding agent, the filled first mold cavity and feeding unit are moved away from each other and a second mold cavity and the feeding unit are moved into engagement with each other, the second mold cavity is filled with plastic containing a volume expanding agent via the feeding unit, the plastic is expanded in the first mold cavity via the volume expanding agent while the second mold cavity is in engagement with the feeding unit, and the expanded article is ejected from the first mold cavity.

10 Claims, 4 Drawing Sheets

APPARATUS FOR EXPANDING MOLD CAVITIES FOR MAKING PLASTIC ARTICLES WITH VOLUME EXPANDING AGENTS

CROSS-REFERENCE TO RELATED APPLICATION

This is a division, of application Ser. No. 09/203,457, filed Dec. 2, 1998, now U.S. Pat. No. 6,099,769, dated Aug. 8, 2000.

This application claims the benefit of Provisional Application Ser. No. 60/069,640 for PROCESS AND APPARATUS FOR MOLDING PLASTIC ARTICLES, filed Dec. 15, 1997.

BACKGROUND OF THE INVENTION

The present invention relates to a method and apparatus for making plastic articles, especially wine corks, from plastic resin in a continuous and efficient operation.

Articles such as wine corks as well as others are made using a plastic resin which contains a blowing agent such that after injection of the resin into a mold cavity gas bubbles are formed in the plastic resin. The plastic resin expands in volume as the mold cavity volume is allowed to expand.

Plastic wine corks are particularly useful as they represent an alternative to cork for sealing wine bottles. These and other articles may be prepared by the process described above which is termed "foam molding". This process and apparatus requires that the mold cavity can expand to allow gas bubbles to form in the resin as it cools.

Unfortunately, however, this procedure takes a substantial amount of time as cooling a relatively thick part, particularly a relatively thick part that contains gas bubbles therein, is inherently slow especially due to the very poor thermal transmission properties of the gas filled plastic.

SUMMARY OF THE INVENTION

The main object of the present invention is to provide an efficient and expeditious process and apparatus for preparing relatively thick plastic parts containing gas therein.

Another object of the present invention is to provide a process and apparatus as aforesaid for efficiently and expeditiously preparing such relatively thick plastic parts, as plastic wine corks.

A further object of the present invention is to provide a process and apparatus as aforesaid that separates the cooling phase of the molding cycle from the remainder of the cycle allowing the operation to be more effectively performed.

The present invention performs the molding operation in a first state of the cycle. Subsequent stages permit mold cavity expansion, article cooling and article expansion while at the same time permitting the molding of further articles. The final stage of the cycle is the ejection of the cooled and expanded article.

Thus, the present invention efficiently permits the continuous formation of additional articles while the initially formed article or articles continue their processing steps, as by cooling, expansion and ejection.

Thus, the present invention comprises a process for preparing a molded article, as for example wine corks, which comprises: filling a first mold cavity via a feeding unit in engagement with said first mold cavity with plastic containing a volume expanding agent; moving the filled first mold cavity and feeding unit away from each other, moving a second mold cavity and said feeding unit into engagement with each other and filling said second mold cavity via said feeding unit with plastic containing a volume expanding agent; expanding said plastic in said first mold cavity via said volume expanding agent while said second mold cavity is in engagement with said feeding unit; and ejecting the expanded article from the first mold cavity.

The present invention also comprises an apparatus for forming a molded article, which comprises: first and second mold cavities spaced from each other for forming molded articles; a feeding unit for separately feeding plastic containing a volume expanding agent into said first and second mold cavities; means for separately moving said first and second mold cavities and said feeding unit into and out of engagement with each other; wherein said plastic is expanded in said first mold cavity via said volume expanding agent while said second mold cavity is in engagement with said feeding unit; and means for ejecting the expanded article from the first mold cavity.

Further features of the present invention will appear hereinbelow.

BRIEF DESCRIPTION OF THE DRAWINGS

The present invention will be more readily understood from a consideration of the accompanying drawings, wherein.

DETAILED DESCRIPTION OF PREFERRED EMBODIMENTS

The process and apparatus of the present invention preferably uses a machine and process where the mold indexes to different positions, such as shown in copending U.S. patent application Ser. No. 08/611,362, the disclosure of which is incorporated herein by reference.

Figure 1:
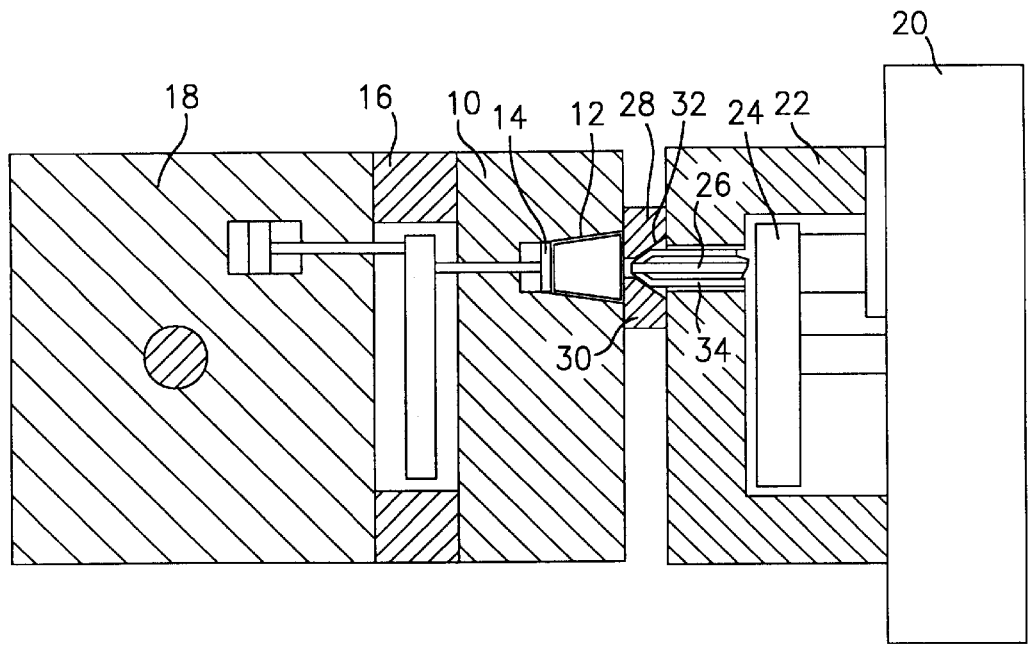
FIG. 1 is a partly schematic, sectional view of the present invention in a mold closed position and during injection.

Referring to FIG. 1 herein, mold block 10 contains a mold cavity 12 therein. Piston 14 slides in mold cavity 12. Mold block 10 is mounted via spacers 16 to machine turret block 18 which in turn is mounted on a slidable carriage (not shown) which moves towards and away from stationary platen 20 of the injection molding machine. Mounted to the stationary platen 20 is hot runner block 22 which in turn contains hot runner manifold 24 and conventional valve gated hot runner nozzle 26 for conveying the heated plastic resin to the mold cavity 12.

Mold closing slides 28, 30 are attached to the front of mold cavity 12 and are moved aside to permit access to mold cavity 12 by the closing movement of turret block 18 towards hot runner block 22. The angled faces 32 on slides 28, 30 contact the conical nozzle tip body 34 and move transversely to the closing motion thereby permitting nozzle access to the mold cavity 12. Cylinders (not shown) may be mounted to mold block 10 to act against slides 28, 30 and to urge the slides in a closing motion to maintain a seal against nozzle 26. A clamp force which is generated by known means (not shown) keeps the mold block 10 pressed against hot runner block 22 during injection of the plastic resin into the mold cavity 12. The plastic resin is then injected into mold cavity 12 to fill the cavity. As indicated hereinabove, the plastic resin contains a blowing agent in accordance with known practice.

Figure 2:
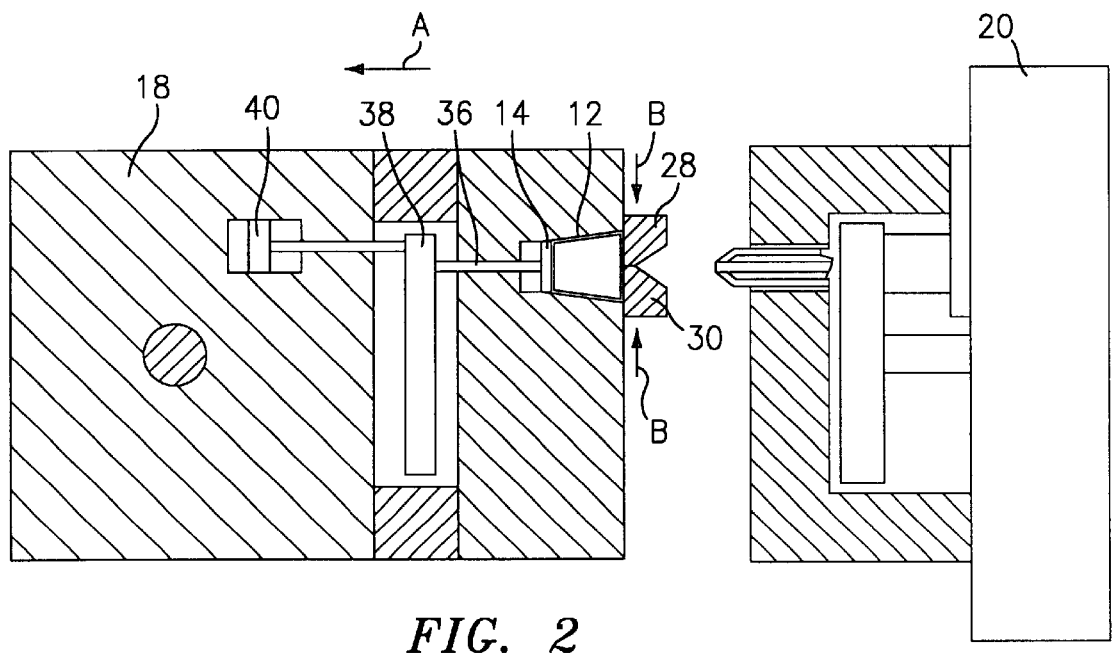
FIG. 2 is a partly schematic sectional view of a further stage of the present invention in a mold open position with the mold closing slides in the closed position.

As shown in FIG. 2, after the mold cavity 12 is filled with plastic resin, the turret block 18 moves away from stationary platen 20 by cylinders (not shown) in the direction of arrow A, thereby causing slides 28, 30 to close across mold cavity 12 in the direction of arrows B, urged by the slide cylinders (not shown). Simultaneously, piston 14 begins to retract in mold cavity 12 causing the volume of mold cavity 12 to increase. Piston 14 is moved via rod 36 which is connected to plate 38 which in turn is moved by cylinder 40 mounted within turret block 18. Naturally, other means may be used to move piston 14 or to expand the volume of mold cavity 12. As the mold cavity volume increases the pressure acting on the plastic resin in the mold cavity is reduced which allows gas bubbles to form in the plastic resin.

Figure 3:
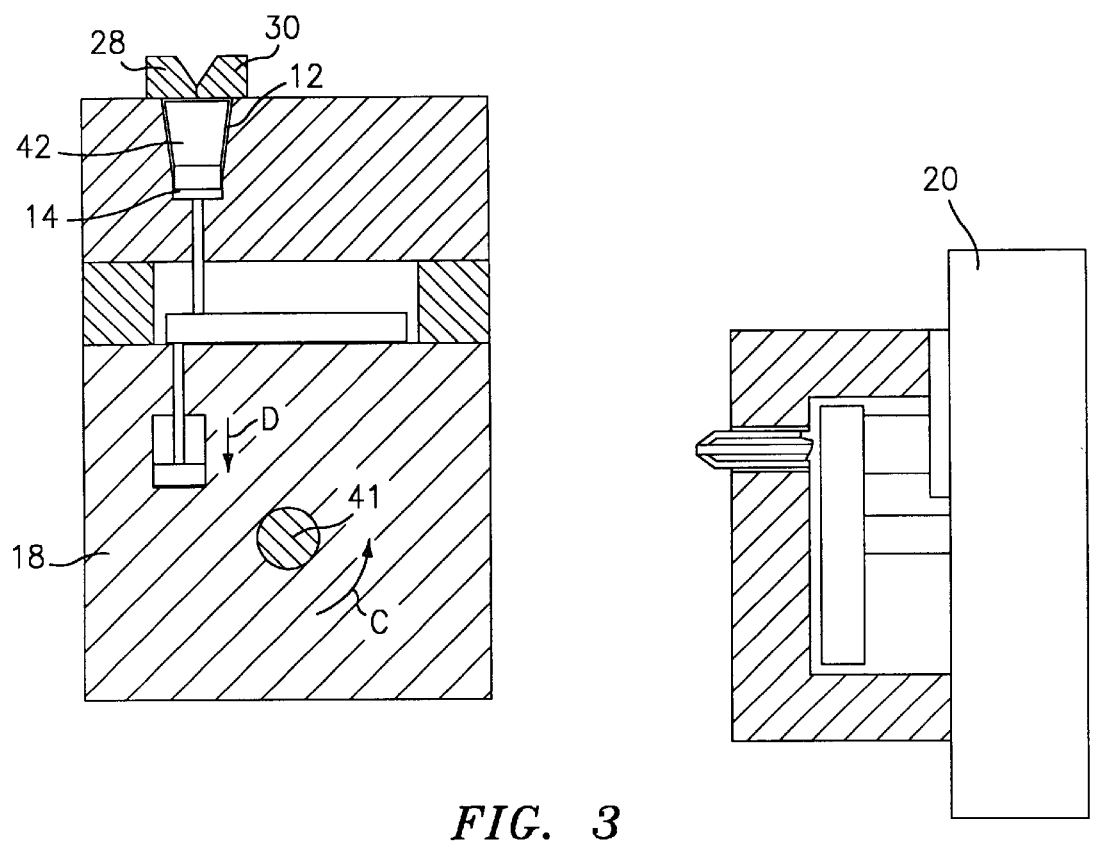
FIG. 3 is a partly schematic, sectional view of a further stage of the present invention after a first 90 degree rotation of the mold.

After turret block 18 has moved away from stationary platen 20 to provide clearance for rotation of the turret block, the block rotates 90 degrees in the direction of arrow C on rod 41 as shown in FIG. 3 to present a new face of mold cavities to be filled in a known fashion (not shown). Naturally, the 90 degree rotation is exemplificative only and other degrees of rotation may be used. In the new position shown in FIG. 3, the filled mold cavity 12 continues to expand as piston 14 is retracted all the way to the end of the mold cavity in the direction of arrow D. Retraction to the end of the mold cavity may of course take place in a different stage of the operation. The molded part 42 continues to cool and more gas bubbles form therein.

Figure 4:
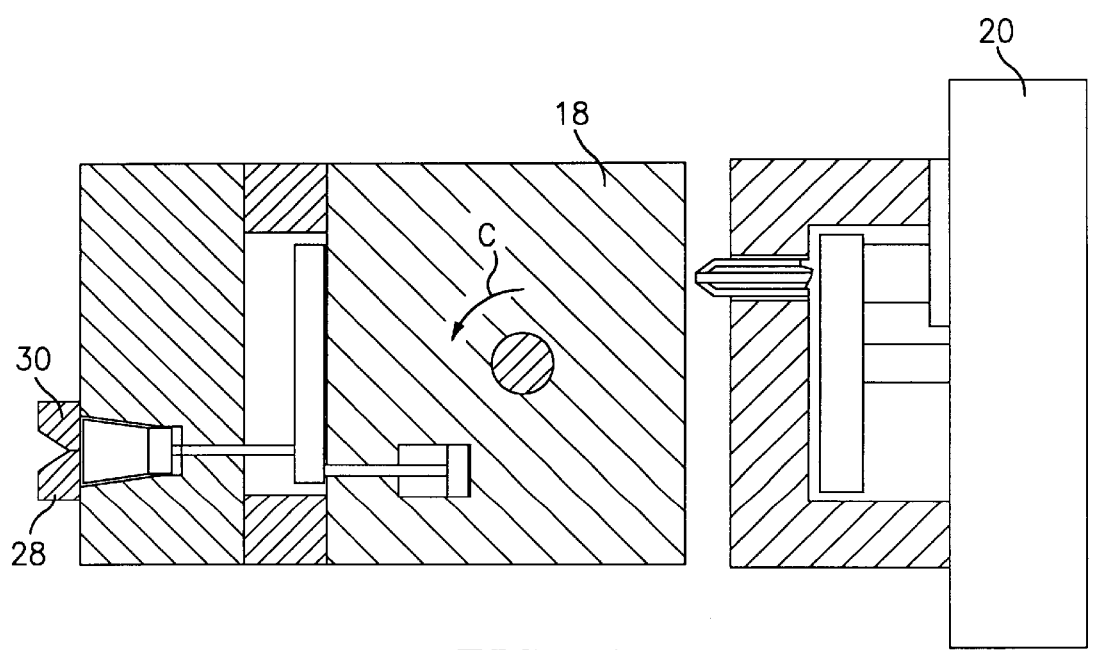
FIG. 4 is a partly schematic, sectional view of a still further stage of the present invention after a second 90 degree rotation of the mold.

A second rotation of a further 90 degrees as shown in FIG. 4 allows the operation to continue as a third set of mold cavities are filled (not shown). In the FIG. 3 and FIG. 4 position, slides 28, 30 continue to be in the closed position.

Figure 5:
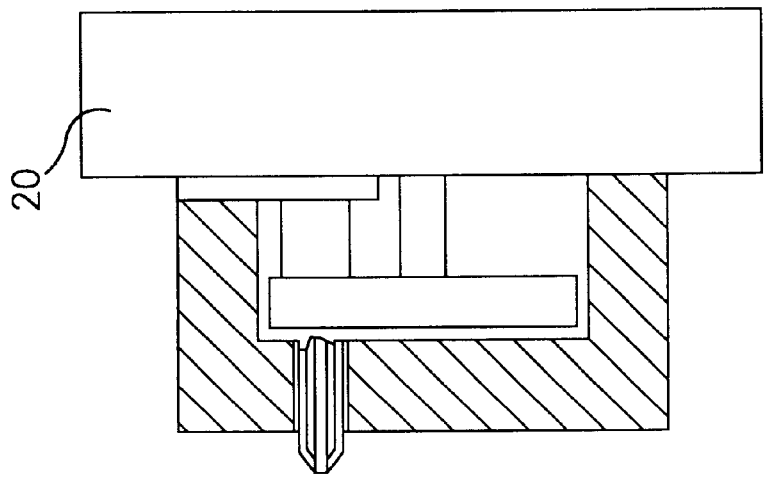
FIG. 5 is a partly schematic, sectional view of a still further stage of the present invention after a third 90 degree rotation of the mold and with ejection of the final part.
Figure 5:
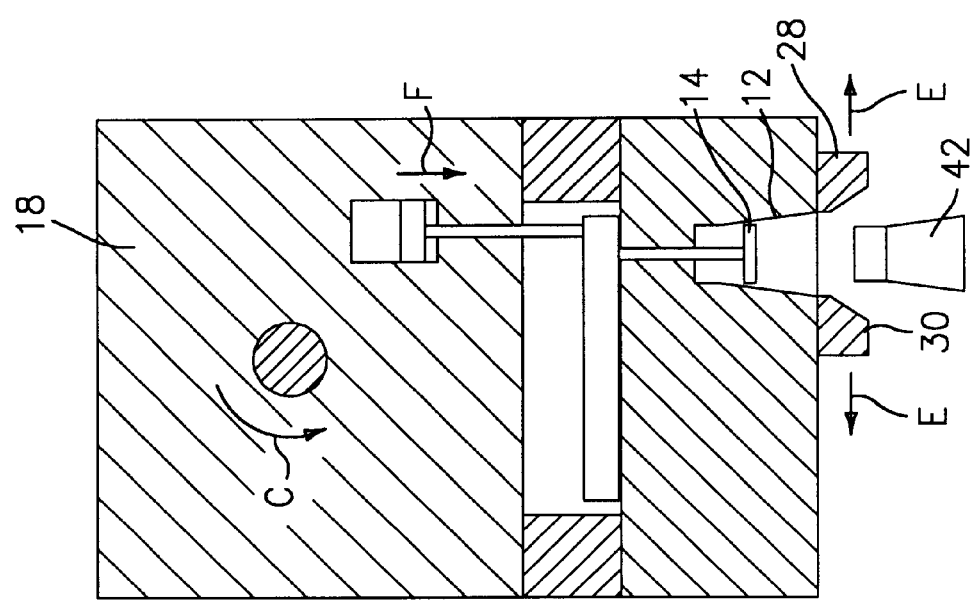

After a third rotation of a further 90 degrees as shown in FIG. 5, mold cavity 12 with cooled part 42 therein is facing downwards and slides 28, 30 are moved aside by their cylinders (not shown) in the direction of arrows E. A further set of articles may then be molded as before. The piston 14 is now advanced its full stroke in the direction of arrow F to push part 42 out of mold cavity 12 as shown in FIG. 5. Thereafter, the slides 28, 30 are repositioned to the position shown in FIGS. 1–4 and turret block 18 rotates a final 90 degrees in the direction of arrow C to begin the cycle again.

Figure 6:
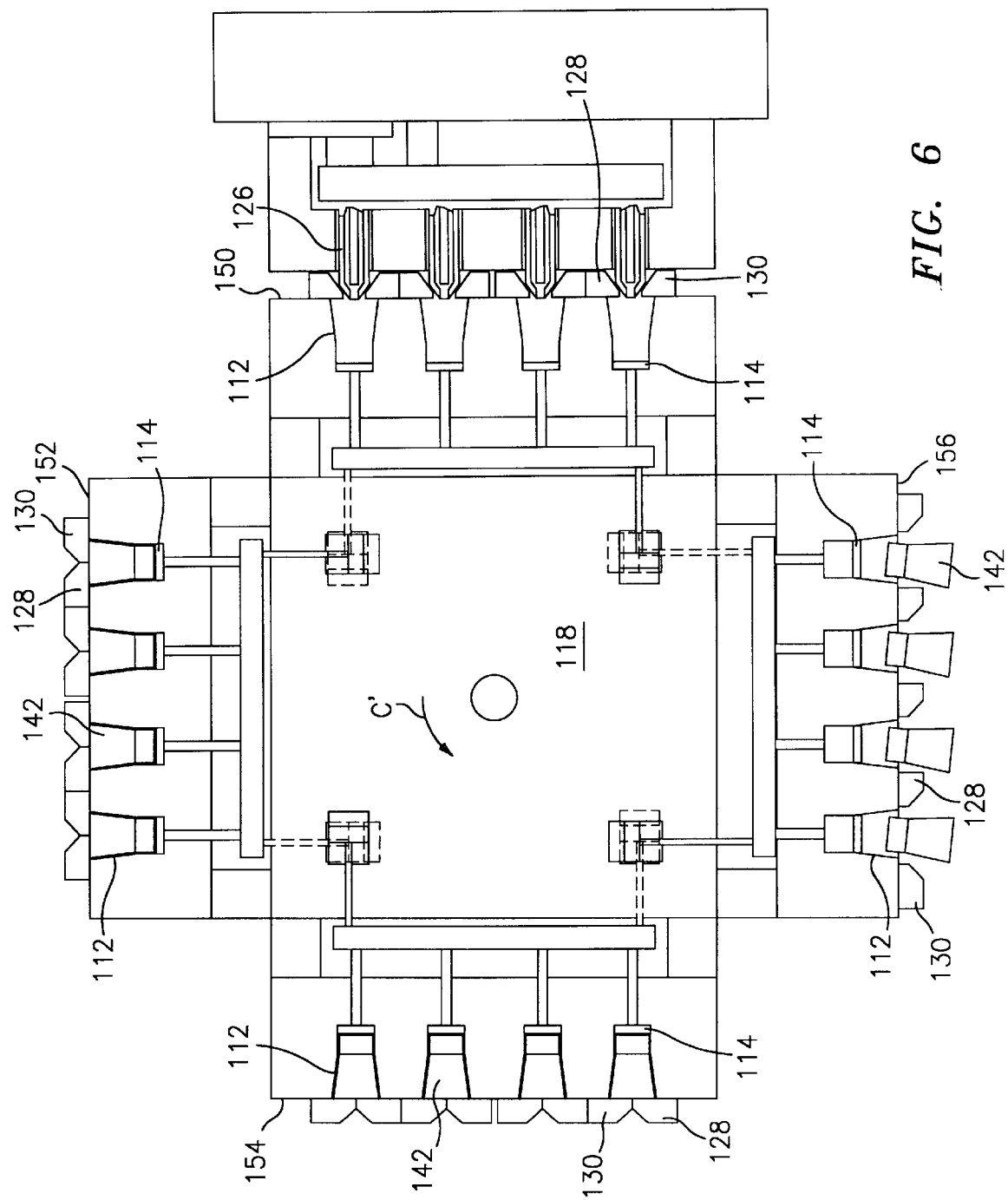
FIG. 6 is a partly schematic, sectional view of the present invention showing a multi-cavity block with each face a having four cavities.

FIG. 6 shows a representative process and apparatus of the present invention with a multi-cavity block with each face showing four mold cavities and with four faces. In fact, if desired, each face could have a plurality of rows of mold cavities, as for example, a 4×4 array with therefore 16 mold cavities on each face.

Thus, referring to FIG. 6, turret block 118 includes four faces 150, 152, 154 and 156. Each face includes four mold cavities 112 with each mold cavity including a piston 114 and with slides 128, 130 associated with each mold cavity. Conventional valve gated hot runner nozzles 126 feed plastic resin into the mold cavities on mold face 150 as shown in FIG. 6 while the previously injected molded parts 142 in the mold cavities on mold faces 152 and 154 continue to cool and more bubbles form therein as shown in FIGS. 3 and 4, and with mold block 118 rotating in the direction of arrow C'. Molded parts 142 in the mold cavities on mold face 156 are then ejected as in FIG. 5. Otherwise the operation is similar to that shown in FIGS. 1–5. Naturally, a different number of mold faces and a different number of cavities may be used, if desired.

It is apparent that the present invention represents an efficient and expeditious operation. The time consuming cooling and gas bubble forming part of the cycle is performed outside of the mold filling station, permitting a much more efficient use of equipment and energy and at the same time additional articles are formed permitting a high volume operation. Naturally, other articles in addition to wine corks may be molded in accordance with the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Apparatus for forming a molded article, which comprises:

first and second mold cavities spaced from each other for forming molded articles;

a feeding unit for separately engaging said first and second mold cavities for separately injecting plastic containing a volume expanding agent into said first and second mold cavities;

means for moving said first mold cavity with injected plastic therein away from said feeding unit;

means for expanding the first mold cavity while the second mold cavity is in engagement with the feeding unit to provide space for expansion of the volume of said plastic in said first mold cavity, wherein the volume of said plastic is expanded in said first mold cavity via said volume expanding agent while said second mold cavity is in engagement with said feeding unit; and means for ejecting the expanded article from the first mold cavity.

2. Apparatus according to claim 1, including a holding means for carrying said first and second mold cavities operative to move said first and second mold cavities.

3. Apparatus according to claim 1, including a plurality of said first and second mold cavities spaced from each other, wherein said feeding unit separately feeds said plastic into one of said first and second mold cavities while the plastic is expanded in the other of said first and second mold cavities.

4. Apparatus according to claim 1, wherein said means for moving at least in part moves said first and second mold cavities in a rotary manner.

5. Apparatus according to claim 3, wherein said plastic is expanded in said second mold cavities via said volume expanding agent while said first mold cavities are in engagement with said feeding unit, and means for ejecting the expanded articles from said second mold cavities.

6. Apparatus according to claim 2, including a mold block for carrying said first and second mold cavities.

7. Apparatus according to claim 1, including means in said first and second mold cavities for expanding the mold cavities to provide space therein for expansion of said plastic.

8. Apparatus according to claim 1, including mold orifices of said first and second mold cavities for engagement with said feeding unit, and means to close said mold orifices after said first and second mold cavities have been filled.

9. Apparatus according to claim 8, including mold closing slides for closing the mold orifices, wherein said mold closing slides are operative to open to permit ejection of expanded articles from said first and second mold cavities.

10. Apparatus according to claim 7, wherein said means for expanding said first and second mold cavities are expanding elements which are also operative to eject the expanded articles.

* * * * *

UNITED STATES PATENT AND TRADEMARK OFFICE
CERTIFICATE OF CORRECTION

PATENT NO. : 6,290,486 B1  
DATED : September 18, 2001  
INVENTOR(S) : Michael Koch Page 1 of 1

It is certified that error appears in the above-identified patent and that said Letters Patent is hereby corrected as shown below:

Column 6,
Line 2, "said" should be deleted.

Signed and Sealed this

Fourteenth Day of May, 2002

Attest:

JAMES E. ROGAN
Attesting Officer
Director of the United States Patent and Trademark Office